US012596384B2

(12) United States Patent
Sherlock et al.

(10) Patent No.: US 12,596,384 B2
(45) Date of Patent: Apr. 7, 2026

(54) SYSTEM AND METHOD FOR MAPPING OBSTRUCTIONS IN A WORK AREA TO CORRESPONDING LOCATIONS

(71) Applicant: Deere & Company, Moline, IL (US)

(72) Inventors: Lance R. Sherlock, Asbury, IA (US); Ryan R. White, Polk City, IA (US)

(73) Assignee: Deere & Company, Moline, IL (US)

( * ) Notice: Subject to any disclaimer, the term of this patent is extended or adjusted under 35 U.S.C. 154(b) by 31 days.

(21) Appl. No.: 18/595,705

(22) Filed: Mar. 5, 2024

(65) Prior Publication Data

US 2025/0291359 A1 Sep. 18, 2025

(51) Int. Cl.
| | |
|---|---|
| *G05D 1/639* | (2024.01) |
| *G05D 1/242* | (2024.01) |
| *G05D 1/243* | (2024.01) |
| *G05D 1/246* | (2024.01) |
| *G05D 1/648* | (2024.01) |

(52) U.S. Cl.
CPC .............. *G05D 1/639* (2024.01); *G05D 1/242* (2024.01); *G05D 1/243* (2024.01); *G05D 1/2462* (2024.01); *G05D 1/648* (2024.01)

(58) Field of Classification Search
CPC ........ G05D 1/639; G05D 1/242; G05D 1/648; G05D 1/2462; G05D 1/243
See application file for complete search history.

(56) References Cited

U.S. PATENT DOCUMENTS

| | | | |
|---|---|---|---|
| 5,585,626 A | 12/1996 | Beck et al. | |
| 5,884,224 A | 3/1999 | Mcnabb et al. | |

(Continued)

FOREIGN PATENT DOCUMENTS

| | | |
|---|---|---|
| EP | 4151062 A1 | 3/2023 |
| EP | 4548732 A1 | 5/2025 |

OTHER PUBLICATIONS

Authors: Yunzhi Guo, Zuoxi Zhao, Xinrong Ke; Title of the article: Exploration of Hard Objects in Superficial Farmland Soil using GPR; International Federation of Automatic Control (IFAC) Papers Online; 51-17 (2018) pp. 582-585; available online at www.sciencedirect.com.

(Continued)

*Primary Examiner* — Ramsey Refai

(74) *Attorney, Agent, or Firm* — Gary L. Montle; Lucian Wayne Beavers; Patterson Intellectual Property Law, PC

(57) ABSTRACT

A system and method are provided for mapping obstructions in a work area traversed by a work machine such as a sprayer, combine or other machine having a ground-engaging work implement. While the work machine traverses the work area, and via output signals from sensors associated with the work machine, obstructions are detected at (e.g., using perception sensing on a combine, etc.) and/or below (e.g., using vibration sensing on a planter, dozer, etc.) a ground surface. A mapped data structure associated with the work area is accordingly modified, wherein a sensed location and one or more identified characteristics for each respective one of the detected obstructions are mapped to corresponding locations in the mapped data structure. The sensors may include vibration sensors or implement actuator position sensors to detect an obstruction contacted by the work machine, and/or perception sensors to detect obstructions on the surface/within a field of view.

20 Claims, 4 Drawing Sheets

(56) References Cited

U.S. PATENT DOCUMENTS

| | | | |
|---|---|---|---|
| 6,282,317 | B1 | 8/2001 | Luo et al. |
| 7,035,461 | B2 | 4/2006 | Luo et al. |
| 7,495,998 | B1 | 2/2009 | Deligeorges et al. |
| 7,610,122 | B2 | 10/2009 | Anderson |
| 7,680,340 | B2 | 3/2010 | Luo et al. |
| 7,860,320 | B2 | 12/2010 | Luo et al. |
| 8,005,631 | B2 | 8/2011 | Barger et al. |
| 8,006,620 | B2 | 8/2011 | Theobald et al. |
| 8,520,897 | B2 | 8/2013 | Boncyk et al. |
| 8,712,144 | B2 | 4/2014 | Mas et al. |
| 8,855,405 | B2 | 10/2014 | Mas et al. |
| 8,965,104 | B1 | 2/2015 | Hickman et al. |
| 9,158,789 | B2 | 10/2015 | Garrett et al. |
| 9,213,905 | B2 * | 12/2015 | Lange .................... G06V 20/58 |
| 9,642,305 | B2 | 5/2017 | Nykamp et al. |
| 9,797,980 | B2 | 10/2017 | Smitherman |
| 9,813,512 | B2 | 11/2017 | Wilbur et al. |
| 10,019,790 | B2 | 7/2018 | Bonefas et al. |
| 10,358,780 | B2 | 7/2019 | Berning et al. |
| 10,401,501 | B2 | 9/2019 | Wood |
| 10,453,165 | B1 | 10/2019 | Kostov et al. |
| 10,474,926 | B1 | 11/2019 | Dirac et al. |
| 10,733,752 | B2 | 8/2020 | Hageman et al. |
| 10,762,605 | B2 | 9/2020 | Chui et al. |
| 11,178,818 | B2 | 11/2021 | Brammeier et al. |
| 11,234,366 | B2 | 2/2022 | Darr et al. |
| 11,240,961 | B2 | 2/2022 | Anderson et al. |
| 11,479,262 | B2 | 10/2022 | Harrison |
| 12,353,210 | B2 * | 7/2025 | Wilson ................. G05D 1/0295 |
| 12,419,220 | B2 * | 9/2025 | Vandike ............... A01D 41/127 |
| 12,422,847 | B2 * | 9/2025 | Vandike ................. B60K 35/60 |
| 2010/0194886 | A1 | 8/2010 | Asari et al. |
| 2012/0237083 | A1 | 9/2012 | Lange et al. |
| 2017/0009578 | A1 | 1/2017 | Barimani et al. |
| 2017/0233955 | A1 | 8/2017 | Berning et al. |
| 2018/0120133 | A1 | 5/2018 | Blank et al. |
| 2018/0165833 | A1 | 6/2018 | Inoue et al. |
| 2019/0061623 | A1 | 2/2019 | Borkowski |
| 2019/0174666 | A1 | 6/2019 | Manternach |
| 2019/0174667 | A1 | 6/2019 | Gresch et al. |
| 2020/0019778 | A1 | 1/2020 | Frei et al. |
| 2020/0202127 | A1 | 6/2020 | Chen et al. |
| 2020/0379479 | A1 | 12/2020 | Dima et al. |
| 2021/0231453 | A1 | 7/2021 | Colosky et al. |
| 2021/0243936 | A1 | 8/2021 | Vandike et al. |
| 2021/0289701 | A1 | 9/2021 | White et al. |
| 2021/0337729 | A1 | 11/2021 | O'Connor et al. |
| 2022/0113729 | A1 | 4/2022 | Vandike et al. |
| 2023/0210039 | A1 | 7/2023 | Pell et al. |
| 2023/0236604 | A1 * | 7/2023 | Frick .................... G05D 1/2297 701/23 |

OTHER PUBLICATIONS

Author: Keith W. Gray; Title of the thesis: Obstacle Detection and Avoidance For An Autonomous Farm Tractor; Utah State University, Logan, Utah Department: Electrical Computer Engineering (2000) (98 pages).

Raytheon BBN Technologies; State-of-the-Art Shooter Detection; boomerang.bbn.com; (2005) (4 pages).

Extended European Search Report and Written Opinion issued in European Patent Application No. 25159914.8 dated Aug. 27, 2025, in 13 pages.

European Search Report for Corresponding Appl. No. 25159914. 8-1105 / 4623659, European Patent Office, dated Nov. 17, 2025, 12 pages.

* cited by examiner

SYSTEM AND METHOD FOR MAPPING OBSTRUCTIONS IN A WORK AREA TO CORRESPONDING LOCATIONS

FIELD OF THE DISCLOSURE

The present disclosure relates generally to work machines configured, for example through the use of ground-engaging work implements, to work the ground in a work area and more particularly to systems and methods for mapping obstructions to locations in a data structure, and preferably a shared data structure for use by multiple work machines, for a work area.

BACKGROUND

Work operations in work areas may frequently involve ground disturbing operations in which the ground adjacent or under the machines is engaged for the purpose of planting, spraying, excavating, scraping, or otherwise disturbing through the use of work implements. A number of different problems can arise in performing these types of operations. For instance, there may be rocks or other hard/dense objects underground or on the surface in a work area (e.g., field). When a work machine such as a planter or seeder unit is running in the field, these objects can be hit or impacted. Such an encounter can possibly damage the planter and the cutting wheel.

Repairs can be time consuming and expensive. In addition, where impacts from the encounter are not readily apparent or are not promptly addressed, a work machine may continue to function but improperly and with adverse impacts on the desired operation. Using the example of a planter unit, an encounter with certain obstructions could result in misalignment (e.g., raising of) the planter for some amount of time. This in turn would result in seeds being planted at the incorrect depth.

BRIEF SUMMARY

The current disclosure provides enhancements to conventional systems and methods, at least in part by detecting obstructions in a work area, substantially in real time during operations by a work machine, and mapping the obstructions (and preferably associated characteristics thereof) to respective locations in a data structure that is accessible by users responsible for the work area.

In one particular and exemplary embodiment, a method is disclosed herein for method of mapping obstructions in a work area traversed by a work machine. While the work machine traverses the work area, and via output signals from one or more sensors associated with the work machine, one or more obstructions are detected at and/or below a ground surface. The method further includes modifying a mapped data structure associated with the work area, wherein a sensed location and one or more identified characteristics for each respective one of the one or more detected obstructions are mapped to corresponding locations in the mapped data structure.

In one exemplary aspect according to the above-referenced method, the work machine may include a machine frame and at least one ground-engaging work implement moveable with respect to the machine frame, wherein obstacles may be detected below the surface of the ground upon contact with the ground-engaging work implement.

In another exemplary aspect according to the above-referenced method, one or more sensors may comprise a vibration sensor, wherein at least one of the one or more obstructions is detected via output signals from the vibration sensor, and an identified location of the work machine upon detecting the at least one of the one or more obstructions corresponds to the sensed location for the at least one of the one or more obstructions.

Another exemplary aspect according to the above-referenced method may include modifying the mapped data structure to map sensed vibrations at respective locations within the work area to corresponding locations in the mapped data structure.

Another exemplary aspect according to the above-referenced method may include determining a baseline vibration level or range associated with the work area, and detecting the at least one of the one or more obstructions based at least in part on comparison of a respective vibration value to the baseline vibration level or range.

In another exemplary aspect according to the above-referenced method, the one or more sensors may include a position sensor associated with a work implement actuator, and at least one of the one or more obstructions is detected via an error value for a detected position of the work implement actuator with respect to a commanded position of the work implement actuator.

In another exemplary aspect according to the above-referenced method, wherein obstacle detection may be performed without a ground-engaging implement or equivalent sensor for below-ground cases, the one or more sensors may include a perception sensor having a field of view in a forward direction with respect to the work machine, and at least one of the one or more obstructions is automatically detected via classification of objects within the field of view.

Another exemplary aspect according to the above-referenced method may include iterative development of a model over time to correlate input data sets, corresponding to the output signals from the one or more sensors, with labeled outcomes, wherein the labeled outcomes are selected from among obstructions having one or more corresponding characteristics, and wherein obstructions during a current traverse of the work area by the work machine are detected by reference to the model based on current input data sets corresponding to the output signals from the one or more sensors. At least one of the one or more characteristics may correspond to a severity of a respective obstruction.

Another exemplary aspect according to the above-referenced method may include determining an intervention event at least in part by comparing at least one of the one or more identified characteristics for a respective obstruction to corresponding intervention states.

At least one intervention state may for example comprise a user specified threshold for an obstruction size.

Another exemplary aspect according to the above-referenced method may include modifying the mapped data structure associated with the work area, wherein indicia corresponding to at least one type of intervention event is mapped to corresponding obstructions and respective locations within the mapped data structure.

Another exemplary aspect according to the above-referenced method may include controlling one or more components of the work machine based on at least one type of determined intervention event.

In another embodiment, a system as disclosed herein for mapping obstructions in a work area includes a work machine, one or more sensors associated with the work machine, one or more processors functionally linked to the one or more sensors and configured, while the work machine traverses the work area, to direct the performance of operations according to the above-referenced method embodiment and optionally any of the further referenced aspects according thereto.

In one exemplary aspect according to the above-referenced system embodiment, at least one of the one or more processors may be associated with a cloud computing network.

In another exemplary aspect according to the above-referenced system embodiment, at least one of the one or more processors may be associated with a work machine controller.

Numerous objects, features, and advantages of the embodiments set forth herein will be readily apparent to those skilled in the art upon reading of the following disclosure when taken in conjunction with the accompanying drawings.

DETAILED DESCRIPTION

Figure 1:
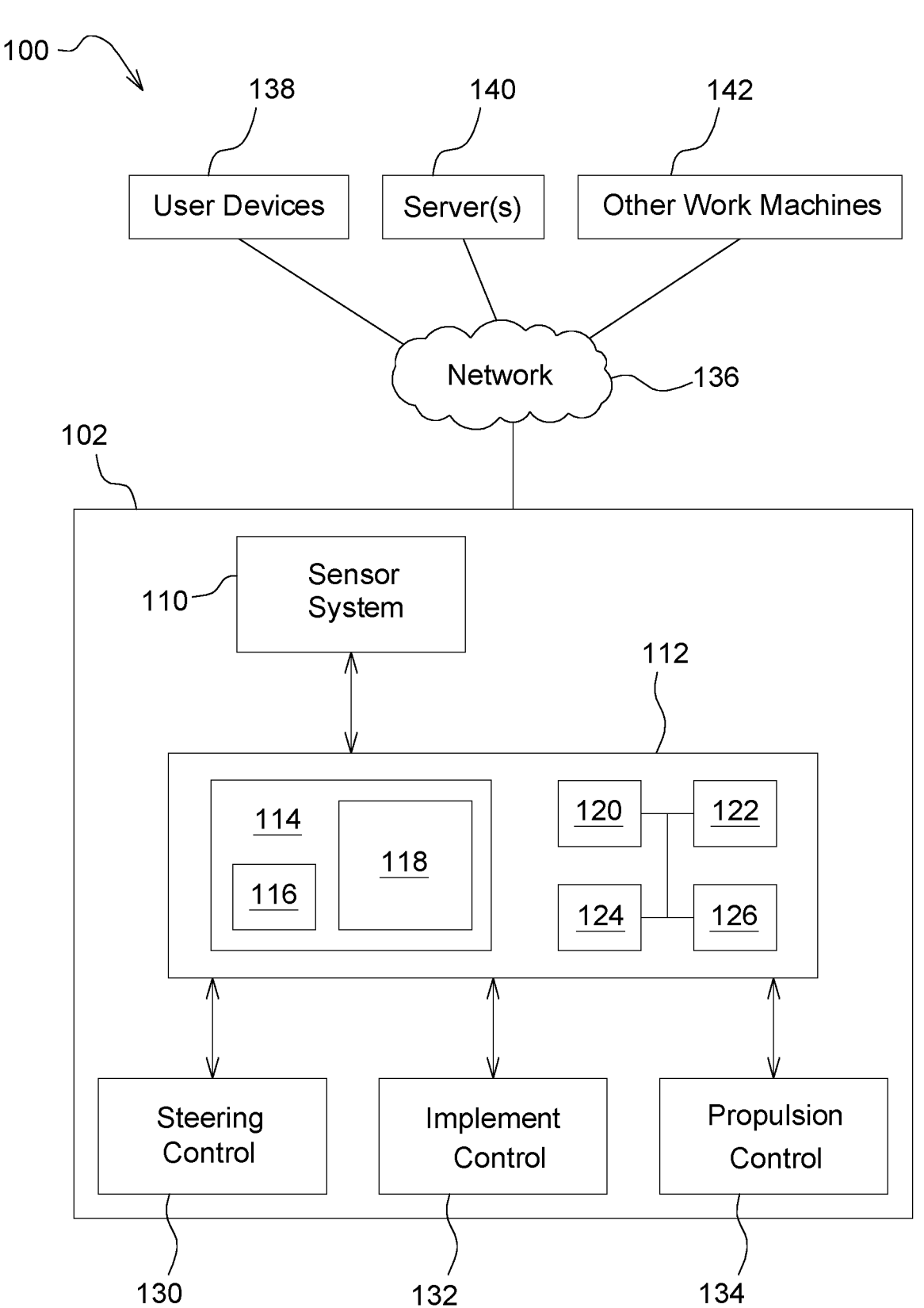
FIG. 1 is a block diagram representing an exemplary system according to an embodiment of the present disclosure.

With reference herein to the representative figures, various embodiments may now be described of an inventive system and method for mapping encountered obstructions to locations in a data structure that is preferably updated and shared across a common platform with respect to various work machines traversing or otherwise operating in a work area.

In some embodiments, obstacles at least partially resting on the surface of the work area may be identified using perception sensors as further discussed below, georeferenced based on a GNSS-determined position (or equivalent) of the work machine, and then mapped for avoidance and/or subsequent pick up and removal from the work area. A size threshold may for example be set to determine and/or specify which obstacles should be removed.

In some embodiments, obstacles beneath the surface of the work area, or at least not identified or identifiable using a perception system, may be further identified using other sensors such as for example detected vibrations or detected movements in a ground-engaging work implement that are consistent with subterranean impacts.

Unless otherwise stated, a work machine according to a system and method as disclosed herein may be configured with ground-engaging capabilities and able to detect obstacles below the ground surface based on contact therewith, such as for example a dozer, excavator, planter, etc., or the work machine may lack ground-engaging capabilities and detects obstacles at the ground surface using perception sensing capabilities, such as for example a sprayer, combine, dump truck, etc. One of skill in the art may appreciate that in some cases, a work machine may be provided with both capabilities.

FIGS. 1-4 in a particular embodiment as disclosed herein relate to a system 100 for mapping obstructions 156a, 156b to corresponding locations in a work area 158 being traversed by a work machine 102. The work machine 102 may include a work vehicle 104 towing, pushing, or otherwise having integrated therewith one or more work implements 106 for use in the work area. A work implement 106 may for example be configured to physically engage, spray, or otherwise work terrain, crops, or other features as may be appreciated by one of skill in the art, depending on the desired operation and work area.

The exemplary system 100 of FIG. 1 includes a sensor system 110 coupled or otherwise functionally linked to a controller 112 including a user interface 114. The controller 112 may be part of a machine control system of the work machine 102, or it may be a separate control module. The controller 112 is configured to receive input signals from one or more sensors defining a sensor system 110 as further described below. Various of the sensors 110 may typically be discrete in nature, but signals representative of more than one input parameter may be provided from the same sensor, and a sensor system 110 as disclosed herein may further include or otherwise refer to signals provided from the controller 112, an electronic control unit, the machine control system, or the like.

In turn, the controller 112 may have integrated therein or otherwise generate control signals for any or all of the steering control unit 130, the implement control unit 132, and/or the propulsion control unit 134, and/or any other component or system that is/are consistent with work machine operations, and subject to modification or interruption by the system 100 or another system. For example, control signals may comprise a steering control signal or data message that defines a steering angle of the steering shaft, a braking control signal or data message that defines the amount of deceleration, hydraulic pressure, or braking friction to the applied to brakes, a propulsion control signal or data message that controls a throttle setting, a fuel flow, a fuel injection system, vehicular speed, or vehicular acceleration. Further, where a work vehicle 104 of the work machine 102 may be propelled by an electric drive or electric motor, the propulsion control signal may control or modulate electrical energy, electrical current, electrical voltage provided to an electric drive or motor. The control signals generally vary with time as necessary to track the path plan. The lines that interconnect the components of the system 100 may comprise logical communication paths, physical communication paths, or both. Logical communication paths may comprise communications or links between software modules, instructions, or data, whereas physical communication paths may comprise transmission lines, data buses, or communication channels, to name non-limiting examples.

The steering control unit 130 may comprise or otherwise interact with an electrically controlled hydraulic steering system, an electrically driven rack and pinion steering, an Ackerman steering system, or another steering system. The propulsion control unit 134 may comprise or otherwise interact with an internal combustion engine, an internal combustion engine-electric hybrid system, an electric drive system, or the like.

The sensor system 110 may include one or more perception sensors coupled to the work machine 102, for example on a boom of a sprayer or a tillage bar as exemplary work implements 106, or on the work vehicle 104 itself, and arranged to provide a perception field 128 (e.g., corresponding to a field of view for a stereo camera as the perception sensor) encompassing at least a portion of the work area in a forward direction 108 for, and to be traversed by, the work machine 102. The perception sensor(s) may be functionally linked to the controller 112 as further described herein for image processing features and steps. It may be appreciated that examples of perception sensors within the scope of the present disclosure may include, instead or in addition to a stereo camera, one or more of a digital (CCD/CMOS) camera, an infrared camera, a stereoscopic camera, a time-of-flight/depth sensing camera, high resolution light detection and ranging (LiDAR) scanners, radar detectors, laser scanners, and the like.

The sensor system 110 may further for example comprise a position determining system and/or an obstacle detection system which individually or collectively include one or more of global navigation satellite system (GNSS) sensors, vehicle speed sensors, ultrasonic sensors, laser scanners, radar wave transmitters and receivers, thermal sensors, structured light sensors, other optical sensors, and the like within the scope of the present disclosure.

The controller 112 may be configured to produce outputs, as further described below, to a user interface 114 associated with a display unit 118 for display to the human operator. The controller 112 may be configured additionally or in the alternative to produce outputs to a display unit independent of the user interface 114 such as for example a mobile user device 138 associated with the operator, a display unit functionally linked to one or more remote servers 140, one or more other work machines 142, etc. The controller 112 may be configured to receive inputs from the user interface 114, such as user input provided via the user interface 114.

The controller 112 may in some embodiments further receive inputs from the remote user devices 138, servers 140, and/or other work machines 142 via respective user interface, for example a display unit with touchscreen interface. Data transmission between, for example, the controller 112 and a remote user interface may take the form of a wireless communications network 136 and associated components as are conventionally known in the art. In certain embodiments, a remote user interface and vehicle control systems for respective work machines 142 may be further coordinated or otherwise interact with a remote server 140 or other external user computing device 138 for the performance of operations in a system 100 as disclosed herein.

The controller 112 may for example include or be associated with a processor 120, a computer readable medium 122, a communication unit 124, data storage 126 such as for example may include a database network, and the aforementioned user interface 114 (for example as part of an onboard vehicle control panel or otherwise discretely disposed) having a display unit 118. An input/output device 116, such as a keyboard, joystick, touch screen, or other user interface tool, may be provided so that a human operator may input instructions to the controller 112. It may be understood that the controller 112 described herein may be a single controller having all of the described functionality, such as for example being part of a central vehicle control unit, or it may include multiple controllers wherein the described functionality is distributed among the multiple controllers.

Various operations, steps or algorithms as described in connection with the controller 112 can be embodied directly in hardware, in a computer program product such as a software module executed by the processor 120, or in a combination of the two. The computer program product can reside in RAM memory, flash memory, ROM memory, EPROM memory, EEPROM memory, registers, hard disk, a removable disk, or any other form of computer-readable medium 122 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 120 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 124 may support or provide communications between the controller 112 and external systems or devices, and/or support or provide communication interface with respect to internal components of the work machine 102. The communications unit may include wireless communication system components (e.g., via cellular modem, WiFi, Bluetooth, or the like) and/or may include one or more wired communications terminals such as universal serial bus ports.

The data storage 126 in an embodiment may for example be configured to receive and retrievably store raw and/or transformed values and data sets, operating parameters, data structures, algorithms, models, etc., within the scope of the present disclosure. Data storage as discussed herein may, unless otherwise stated, generally encompass hardware such as volatile or non-volatile storage devices, drives, memory, or other storage media, as well as one or more databases residing thereon, and may for example encompass one or more data storage media in functional communication with a common processor or plurality thereof.

Figure 2:
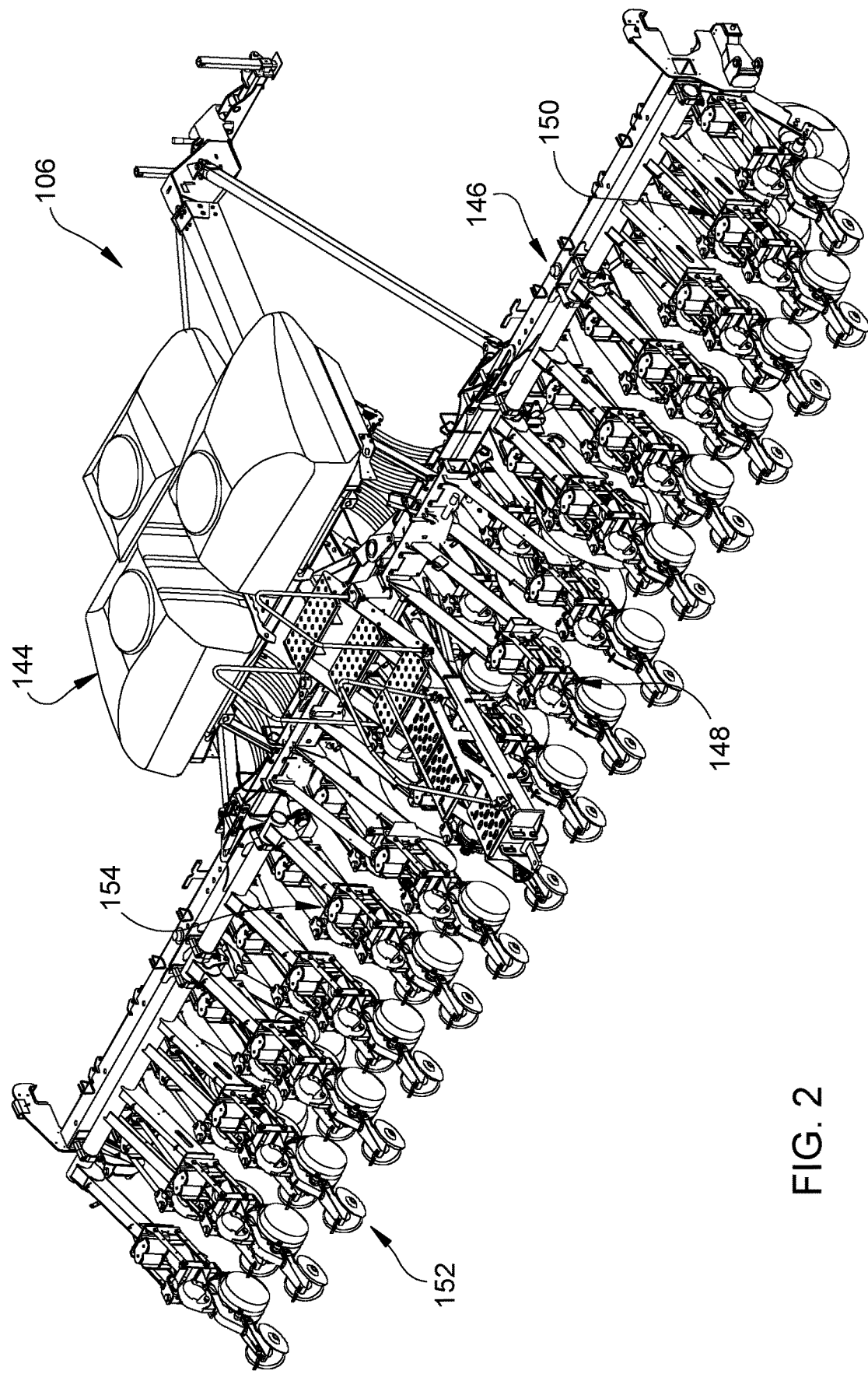
FIG. 2 is a perspective view representing an exemplary work implement according to an embodiment of the present disclosure.

Referring to FIG. 2, an exemplary work implement 106 within the scope of the present disclosure may be a seeder implement comprising a single row seeder unit, or simply row unit, which may be attached, via for example a tow bar (not shown), to be towed behind a work vehicle 104, such as a tractor, during a seeding operation in a field. The work implement 106 may be configured to deliver a commodity (e.g., seed fertilizer, and/or other particulate or granular commodity) stored in one or more containers 144 to the work area (field) being traversed by the work machine 100.

The work implement 106 can comprise a movable frame 148, which is configured to move (e.g., up and down) during operation, that can be operably coupled to a stationary frame 146 by a linkage 150. In some implementations, the linkage 150 can comprise a four-bar linkage that can be used to keep the movable frame 148 substantially parallel to the stationary frame 146 as it moves up and down.

The work implement 106 may comprise one or more actuators 154 configured to adjust the downward force of the ground working tools 152 against the soil. To increase the downward force in excess of the row unit weight, or to be able to adjust the force, hydraulic and/or pneumatic actuators (and/or one or more springs) can be added to urge the ground working tools 152 downwardly with a controllable force. The one or more actuators 154 may also be used to lift the ground working tools 152 off the ground for transport or to maintain seed depth by adjusting downforce to account for variations in soil density.

Work implement position sensors of the sensor system 110 in an embodiment as represented in FIG. 1 may include a set of inertial navigation system (INS) sensors mounted on the work machine 102, for example including multiple sensors respectively mounted to a main frame of the work vehicle 104 and to the work implement 106. Alternative embodiments of work implement position sensors may include rotary pin encoders mounted at pivot pins to detect the relative rotational positions of the respective components, linear encoders mounted on hydraulic cylinders to detect the respective extensions thereof, inertial measurement units (each, an IMU), and the like.

IMUs, for example, are tools that capture a variety of motion- and position-based measurements, including, but not limited to, velocity, acceleration, angular velocity, and angular acceleration. IMUs may include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field. Generally, an accelerometer provides measurements, with respect to (among other things) force due to gravity, while a gyroscope provides measurements, with respect to (among other things) rigid body motion. The magnetometer provides measurements of the strength and the direction of the magnetic field, with respect to (among other things) known internal constants, or with respect to a known, accurately measured magnetic field. The magnetometer provides measurements of a magnetic field to yield information on positional, or angular, orientation of the IMU; similarly to that of the magnetometer, the gyroscope yields information on a positional, or angular, orientation of the IMU. Accordingly, the magnetometer may be used in lieu of the gyroscope, or in combination with the gyroscope, and complementary to the accelerometer, in order to produce local information and coordinates on the position, motion, and orientation of the IMU.

As conventionally known in the art, an accelerometer is an electro-mechanical device or tool used to measure acceleration $(m/s^2)$, which is defined as the rate of change of velocity (m/s) of an object. Accelerometers sense either static forces (e.g., gravity) or dynamic forces of acceleration (e.g., vibration and movement). An accelerometer may receive sense elements measuring the force due to gravity. By measuring the quantity of static acceleration due to gravity of the Earth, an accelerometer may provide data as to the angle the object is tilted with respect to the Earth, the angle of which may be established in an x-, y-, and z-axis coordinate frame. However, where the object is accelerating in a particular direction, such that the acceleration is dynamic (as opposed to static), the accelerometer produces data which does not effectively distinguish the dynamic forces of motion from the force due to gravity by the Earth. Also as conventionally known in the art, a gyroscope is a device used to measure changes in orientation, based upon the object's angular velocity (rad/s) or angular acceleration $(rad/s^2)$. A gyroscope may constitute a mechanical gyroscope, a micro-electro-mechanical system (MEMS) gyroscope, a ring laser gyroscope, a fiber-optic gyroscope, and/or other gyroscopes as are known in the art. Principally, a gyroscope is employed to measure changes in angular position of an object in motion, the angular position of which may be established in an x-, y-, and z-axis coordinate frame.

In an embodiment, output signals from different sensors in sensor system 110 may be fused in a coordinate frame which is independent of a global navigation frame for the work machine 102, wherein for example measurements received by work implement position sensors and other sensors associated with the work machine 102 may be merged to identify specific locations, operations, and the like with the scope of an operation as further described below.

Figure 3:
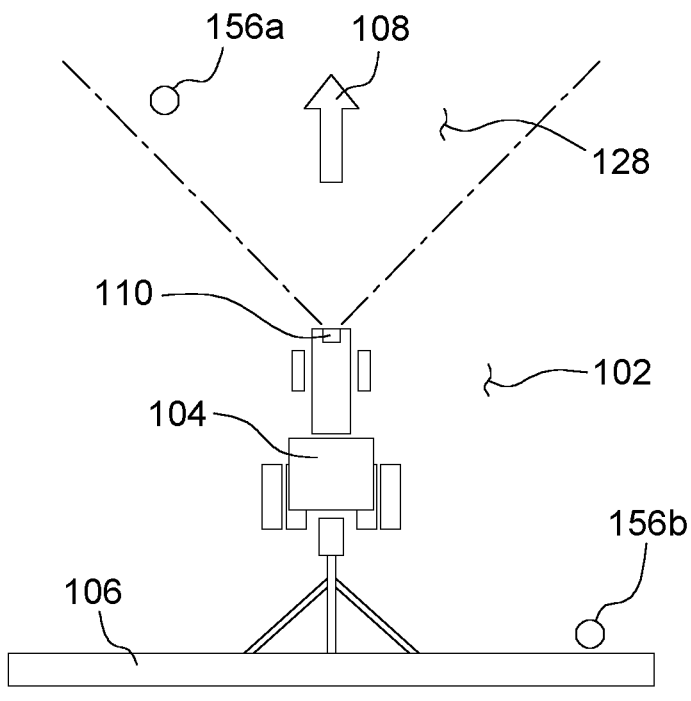
FIG. 3 is a top view representing multiple objects in a work area traversed by a work vehicle towing a work implement according to an embodiment of the present disclosure.
Figure 4:
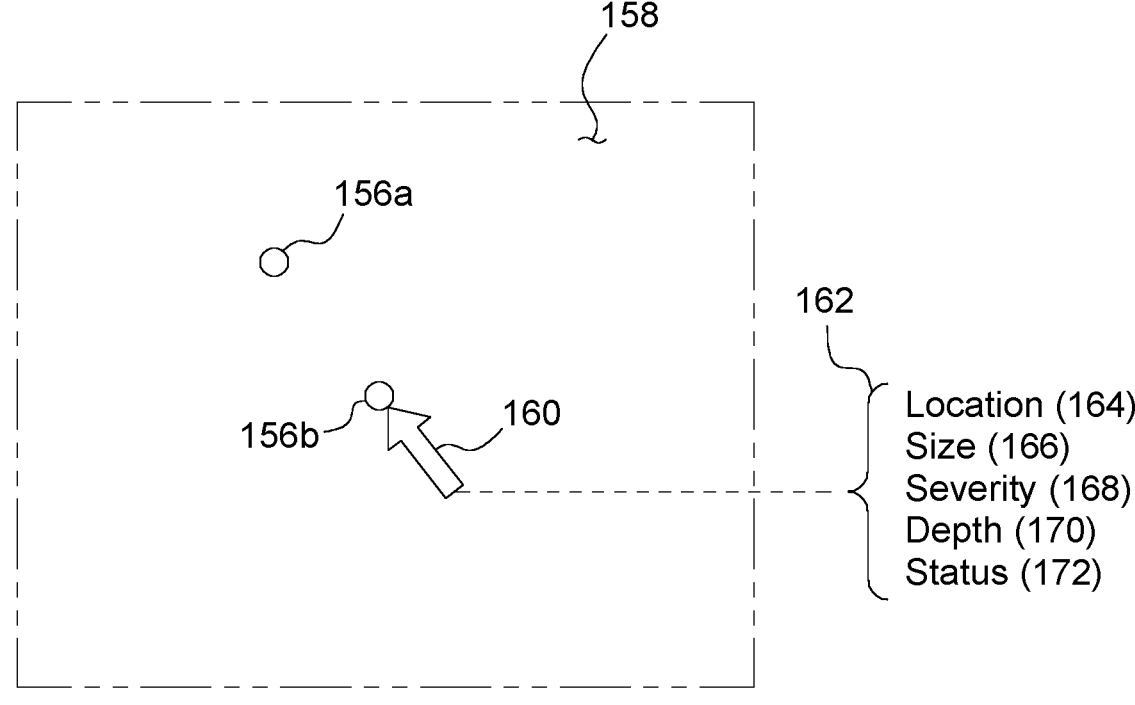
FIG. 4 is a graphical diagram representing a display portion of a user interface associated with the work area and populated with indicia associated with the objects shown in FIG. 3.

As represented in FIG. 3, embodiments of a work machine 102 may include a sensor system 110 including a perception sensor mounted on the work vehicle 104 and arranged such that a corresponding perception field 128 may include one or more visible obstacles 156a in a forward direction 108 for the work vehicle 104 and/or a work implement 106 associated therewith. Embodiments of the work machine 102 may include the sensor system 110 being further configured to identify one or more subterranean obstacles 156b upon impact by the vehicle 104 and/or a work implement 106 associated therewith.

Figure 5:
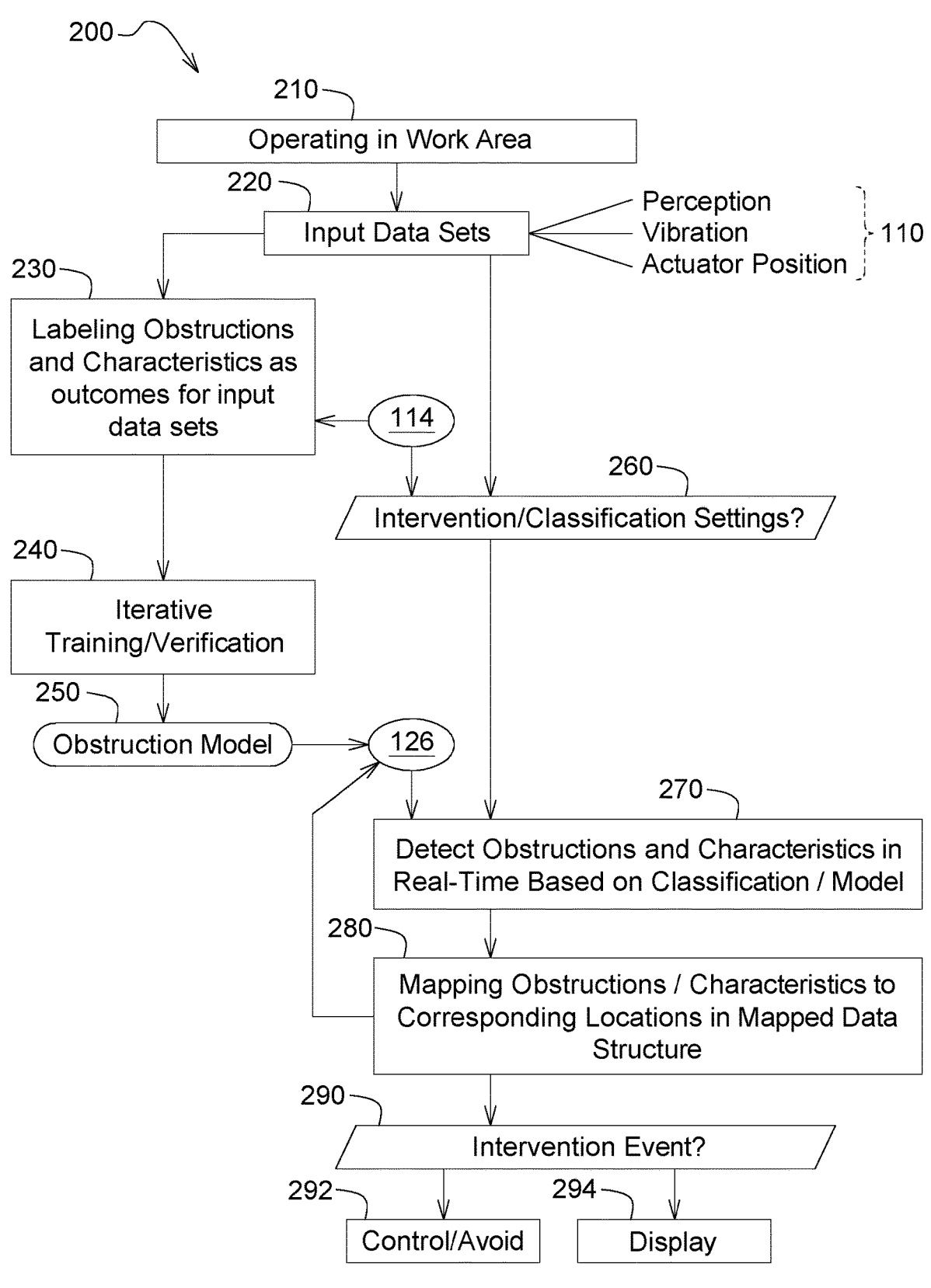
FIG. 5 is a flowchart representing an exemplary embodiment of a method as disclosed herein.

In FIG. 5, the depicted flowchart represents an exemplary embodiment of a method 200 for mapping obstructions to corresponding locations in a work area traversed by one or more work machines. For illustrative purposes, but not limiting on the scope of the systems and methods disclosed herein unless otherwise specifically noted, FIG. 5 will be described in the context of a system 100, work machine 102, work vehicle 104, work implement 106, and the like as illustrated in FIGS. 1-4. While the illustrated embodiment may include a specific arrangement of steps, inputs, outputs, and the like, it may be understood that certain steps may be combined, performed in a different order, or even omitted altogether in other embodiments within the scope of the present disclosure, unless otherwise specifically noted herein.

As illustrated in step 210, an embodiment of the method 200 may be performed with the operation of one or more work machines within a work area at issue. Various steps may be described by reference to a single work machine, but it may be understood that multiple work machines of like or differing types may operate in the same work area and even communicate with each other to share a mapped data structure corresponding to the work area as described herein. In some embodiments, for example, obstruction mapping operations may be performed by a first work machine which updates a worksite map for the benefit of one or more additional work machines and earth working operations performed in the worksite by the work machines, which may be regardless of the type of earth working operations being performed.

As illustrated in step 220, input data sets may be collected over time by a sensor system of the work machine, including for example perception inputs such as captured images, vibration inputs from IMU's or equivalent sensors, position inputs representing a relative position of the work implement such as for example may be provided by actuator-mounted sensors, and the like.

As illustrated in step 230, the method 200 may include development of one or more models over time to correlate historical input data sets, for example corresponding to the output signals from sensor systems of the work machine and/or other work machines, with labeled outcomes. Exemplary such outcomes may for example be selected manually (for example, via input from user interface 114) or even applied automatically in some embodiments from among obstructions having one or more corresponding characteristics.

Models may be iteratively trained using at least "test" input data sets and corresponding outcome labels, and in various embodiments further verified (step 240) to produce one or more obstruction models which may be retrievably located in data storage 126 for selection during a current operation based on relevant parameters (step 250). The trained and validated models may accordingly be utilized for prediction based on "current" data sets. The current datasets may further be utilized as feedback and accordingly a test dataset for further training and/or validation of the existing models.

In some embodiments, the models may include neural network-based models having variable governing parameters which are optimized during training to better simulate (or approximate in a particular simulation) observed real-life results corresponding to an input data set. Such parameters may initially be set (e.g., user-specified) before training (as also referenced below in step 260). Tuning of the hyperparameters, or in other words optimizing the values there for, follows during training to obtain a set of values for the parameters corresponding to an accurate input-output mapping of the neural network for the training data set. In various embodiments, tuning of parameters may be performed automatically during or between training iterations, manually based on user selection via a user interface, or combinations thereof. In some embodiments the parameters are not initially user-specified but instead predetermined formulaically or otherwise according to a "best guess" distribution of possible simulation parameters corresponding to a specified career output array, and in some embodiments may initially be unknown and merely derived during training. The parameters may for example determine aspects of the neural network structure and/or training parameters, such as the number of hidden neuron layers, number and/or definition of training steps, learning rates, batch size, and the like.

During the training as described above, and/or during a current operation, based for example on current input data sets (step 220), the method 200 may further involve receiving intervention and/or classification settings (step 260), which may be received for example via a user interface 114. As further described herein, such settings may be used to define thresholds for determining an intervention state, such as threshold sizes for obstructions for triggering control and/or alert responses, input labels for training a machine learning model to classify encountered (e.g., predicted, observed, and/or impacted) objects, input labels for classifying a severity of an encountered object, and the like.

The method 200 may continue in a current operation by automatically detecting obstructions and characteristics thereof, substantially in real time with respect to the input data sets, based for example on classifications performed using an appropriate and selectively retrieved model from data storage 126 (step 270).

In an embodiment, at least one of the characteristics may correspond to a severity of a respective obstruction.

The method 200 may continue with mapping of obstructions, and optionally associated characteristics thereof, to corresponding locations in a mapped data structure for the work area (step 280). The method 200 may accordingly include retrieval of an existing electronic work area map, for example downloading of the map from a remote server to a local data storage for updating during a local work operation. Retrieval of the existing work area map may be performed as an independent obstruction mapping operation prior to a work operation, upon initiation of the work operation, or in some cases not at all wherein for example an electronic worksite map is to be generated as part of the subterranean monitoring operation, or wherein sensed information is transmitted (optionally along with corresponding data for defining the obstruction) to a remote location for analysis and selective modifying of the work area map as further described below.

In an embodiment, multidimensional parameters may be generated for the mapped data structure, with two coordinates (x, y) being associated with a current location of the work machine (e.g., a location of a GNSS receiver or equivalent position sensor associated with the work machine, or a determined location of the obstruction detecting sensor relative to the GNSS receiver, etc.) as determined based on input signals from one or more position sensors, and in some embodiments with information for a third coordinate (z) as corresponding to the x, y location, wherein for example the mapped data structure may be able to differentiate obstructions on the surface of the work area, and detectable using perception sensors such as stereo cameras, from obstructions beneath the surface, and likely only detected upon impact.

In an embodiment, one or more position characteristics of the work implement, or relevant portion thereof having impacted an obstacle, may be obtained in part by fusing input signals from a first position sensor (e.g., IMU) associated with the work implement with position signals from a second position sensor (e.g., IMU) associated with the work machine frame in a coordinate system independent of a global navigation frame for the mapped data structure, further wherein the multidimensional parameters are generated at least in part by converting the one or more position characteristics of the work implement into coordinates associated with the global navigation frame.

In an example, one type of obstruction may be detected via output signals from a vibration sensor, which may for example include an IMU or stand-alone accelerometer configured to generate, substantially continuous output signals representing vibration feedback to the controller or other data processor for detecting an obstruction based at least in part on the feedback. A location of the work machine at the time of the detected obstruction may be identified as a location of the obstruction, upon which the mapped data structure is modified to represent the obstruction as corresponding to the identified location.

The mapped data structure may for example be modified dynamically, and substantially in real time with respect to detection of the obstruction. A number of obstructions and corresponding locations may alternatively be collected and stored locally at the work machine or external data storage, for example over a duration corresponding to a work operation in the work area, and then the mapped data structure modified at a specified point (e.g., upon completion of the work operation or a manual input trigger) to represent the collected obstructions and corresponding locations.

Other examples of detecting obstructions are of course contemplated within the scope of the present disclosure, in addition to the vibration example or as alternatives in various embodiments. A position sensor may be associated with a work implement actuator, or otherwise configured to generate output signals representing a relative position of the work implement (or portion thereof) with respect to the work machine frame (or portion thereof), and detect an obstruction at least in part via an error value for a detected position of the work implement with respect to a commanded position of the work implement. In the context of a planter as the work machine, for example, an electronic motor may be used to control seed placement depth for a corresponding row unit. Position sensor feedback to or otherwise within this motor may enable distinguishing of a commanded position via the motor from an actual position after an object has been struck, thus identifying the object.

In another example, a perception sensor as previously described herein and having a field of view in a forward direction with respect to the work machine, may be utilized to automatically detect one or more obstructions via classification of objects within the field of view.

In various embodiment, with respect to any or all of the above-referenced obstacle sensing techniques, the mapped data structure may be modified over time to map detected obstructions at respective locations within the work area to corresponding locations in the mapped data structure. In addition, or alternatively, the method 200 may further involve mapping raw sensor output values to respective locations within the work area, and determining the presence and optionally further characteristics such as severity of an obstruction based on the raw values with respect to baseline or threshold values. For example, in the context of signals from a vibration sensor, the method may include determining baseline a baseline vibration level or range associated with the work area, which may include respective determinations for various portions of the work area, and in some instances detecting obstructions based at least in part on comparison of a respective vibration value to the baseline vibration level or range.

Vibration feedback may in various embodiments may also provide additional useful information back to users, such as for example farmers associated with a work area at issue. An accelerometer or IMU, as noted above for example, may supply continuous vibration feedback which may further be used to characterize work area conditions such as field smoothness, and which in turn may enable decision support such as for example regarding future tillage decisions. In real time, this vibration information may for example cause a farmer to adjust planting speed for more uniform planting, and the like.

In various embodiments, the method 200 may further include determining whether an intervention event has occurred and/or whether an intervention event is appropriately responded to (step 290). This determination may for example be made at least in part by comparing identified characteristics for a respective obstruction to corresponding intervention states. An intervention state may be determined based on an ascertained or predicted size of an obstruction, wherein the size is compared to a user-specified threshold. The intervention state may be determined using an automatic characterization of the threat presented by an obstruction of that size, for example in the absence of a user-specified threshold, and/or as further learned over time using machine learning techniques by observing the effects of impacts with equivalent obstructions.

Where an intervention event is determined and a response is to be conducted, such a response may include automated control of one or more components of the work machine based on at least one type of determined intervention event (step 292). In some embodiments, the automated control may include generated control signals to actuators for raising/lowering the work implement (or components thereof), for example to be lifted from a ground-engaging position in association with a mapped obstacle and predicted impact therewith. In some embodiments, the generated control signals may be provided for suspending operation of the work implement or component thereof. For example, one or more sprayers, seed planters, or the like may be selectively disabled to avoid treating mapped locations of a certain type.

Where an intervention event is determined and a response is to be conducted, such a response may alternatively, or in addition, include generating a display for users via respective user interface functions (step 294).

As represented in FIG. 3, such displays may for example include a geographical representation of the work area 158 and the corresponding locations of detected obstructions, such as and potentially distinguishing visible obstructions 156a, subterranean obstructions 156b, and other labels based on determined characteristics thereof. In an embodiment, the display optionally further includes indicia 162 generated to characterize the intervention event and/or obstruction, such as for example a location 164 of the obstruction, a size 166 of the obstruction, a severity 168 of event and/or obstruction, a depth 170 of the obstruction, a status 172 of the event and/or obstruction (e.g., current, removed, high priority, low priority), a type of event and/or obstruction, and the like. The indicia 162 may be constantly displayed, or may be selectively displayed for example based on manual selection using a cursor 160 and clicking on the respective location.

In another example, the display may take the form of a first image layer on an operator display unit which appears as conventional images captured by perception sensors (e.g., cameras) having fields of view extending from the work machine and into the work area. A second image layer may be generated to be superimposed with respect to the first image layer, such that the first image layer is still readily visible to the operator but notes, indicia, or other parameters corresponding to detected obstacles, obstacle characteristics, work area conditions, or the like are also displayed. As the image layers may be perspective views of the work area rather than overhead (e.g., bird's eye) views, three-dimensional coordinates from the generated or updated work area map may require conversion to determine appropriate locations within the perspective view for appropriately displaying the notes, indicia, or other parameters or otherwise representing a current distance between (for example) the work implement or main frame of the work machine and any subterranean obstacles or conditions of note.

In another example, in addition or in the alternative to the automated control in step 292 and/or the display function in step 294, the method 200 may include alert functions based on an intervention event or state, such as for example to provide audible or visual notifications when a detected or predicted distance between the work machine and any (or specific examples of) mapped obstacles is at or below a defined threshold.

Embodiments of a system and method as disclosed herein may effectively pair one or more work machines in a work area and further inform other downstream users to preserve a stored log of determined obstructions, corresponding locations, and other indicia for enabling an appropriate response, in real time with the work operation (e.g., automated control) and/or afterwards (e.g., a farmer entering the field to move or remove the obstacle prior to a next work operation). The same location, for example identified as latitude and longitude (x, y coordinates) in a global coordinate frame can be referenced by any of the above work machines or other work machines, users, or the like, and further correlated with the determined obstacles, or further referenced to remove obstacles from the mapped data structure where appropriate.

As noted above, the various users may preferably be able to access a shared version of the generated or updated data structure, for example where an electronic worksite map has been uploaded to a remote data storage (e.g., cloud-based) by the work machine having performed a work operation and updated the mapped data structure to include identified obstacles, wherein the updated data structure is retrievable from the remote data storage by subsequent work machines traversing the same work area.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of mapping obstructions in a work area traversed by a work machine, the method comprising:

while the work machine traverses the work area, and via output signals from one or more sensors associated with the work machine, detecting one or more obstructions at and/or below a ground surface; and modifying a mapped data structure associated with the work area, wherein a sensed location and one or more identified characteristics for each respective one of the one or more detected obstructions are mapped to corresponding locations in the mapped data structure, and wherein the mapped data structure comprises a multidimensional coordinate system;

wherein the sensed location is determined based on a location of the obstruction relative to the work machine and a current location of the work machine in the multidimensional coordinate system of the mapped data structure; and determining an intervention event at least in part by comparing at least one of the one or more identified characteristics for a respective obstruction to corresponding intervention states.

2. The method of claim 1, wherein the work machine comprises a machine frame and at least one ground-engaging work implement moveable with respect to the machine frame.

3. The method of claim 2, wherein the one or more sensors comprise a vibration sensor, at least one of the one or more obstructions is detected via output signals from the vibration sensor, and an identified location of the work machine upon detecting the at least one of the one or more obstructions corresponds to the sensed location for the at least one of the one or more obstructions, the method further comprising:

modifying the mapped data structure to map sensed vibrations at respective locations within the work area to corresponding locations in the mapped data structure;

determining a baseline vibration level or range associated with the work area; and detecting the at least one of the one or more obstructions based at least in part on comparison of a respective vibration value to the baseline vibration level or range.

4. The method of claim 2, wherein the one or more sensors comprise a position sensor associated with a work implement actuator, and at least one of the one or more obstructions is detected via an error value for a detected position of the work implement actuator with respect to a commanded position of the work implement actuator.

5. The method of claim 1, wherein the one or more sensors comprise a perception sensor having a field of view in a forward direction with respect to the work machine, and at least one of the one or more obstructions is automatically detected via classification of objects within the field of view.

6. The method of claim 1, comprising iterative development of a model over time to correlate input data sets, corresponding to the output signals from the one or more sensors, with labeled outcomes, wherein the labeled outcomes are selected from among obstructions having one or more corresponding characteristics, and wherein obstructions during a current traverse of the work area by the work machine are detected by reference to the model based on current input data sets corresponding to the output signals from the one or more sensors.

7. The method of claim 6, wherein at least one of the one or more characteristics corresponds to a severity of a respective obstruction.

8. The method of claim 1, wherein at least one intervention state comprises a user specified threshold for an obstruction size.

9. The method of claim 1, comprising modifying the mapped data structure associated with the work area, wherein indicia corresponding to at least one type of intervention event is mapped to corresponding obstructions and respective locations within the mapped data structure.

10. The method of claim 1, comprising controlling one or more components of the work machine based on at least one type of determined intervention event.

11. A system for mapping obstructions in a work area, the system comprising:

one or more sensors associated with a work machine; and one or more processors functionally linked to the one or more sensors and configured, while the work machine traverses the work area, via output signals from the one or more sensors, to detect one or more obstructions at and/or below a ground surface, and modify a mapped data structure associated with the work area, wherein a sensed location and one or more identified characteristics for each respective one of the one or more detected obstructions are mapped to corresponding locations in the mapped data structure, and wherein the mapped data structure comprises a multidimensional coordinate system;

wherein the sensed location is determined based on a location of the obstruction relative to the work machine and a current location of the work machine in the multidimensional coordinate system of the mapped data structure; and wherein the one or more processors are further configured to determine an intervention event at least in part by comparing at least one of the one or more identified characteristics for a respective obstruction to corresponding intervention states.

12. The system of claim 11, wherein at least one of the one or more processors is associated with a cloud computing network.

13. The system of claim 11, wherein at least one of the one or more processors is associated with a work machine controller.

14. The system of claim 11, wherein the work machine comprises a machine frame and at least one ground-engaging work implement moveable with respect to the machine frame.

15. The system of claim 14, wherein the one or more sensors comprise a vibration sensor, at least one of the one or more obstructions is detected via output signals from the vibration sensor, and an identified location of the work machine upon detecting the at least one of the one or more obstructions corresponds to the sensed location for the at least one of the one or more obstructions.

16. The system of claim 11, wherein the one or more sensors comprise a perception sensor having a field of view in a forward direction with respect to the work machine, and at least one of the one or more obstructions is automatically detected via classification of objects within the field of view.

17. The system of claim 11, wherein the one or more processors are configured for iterative development of a model over time to correlate input data sets, corresponding to the output signals from the one or more sensors, with labeled outcomes, wherein the labeled outcomes are selected from among obstructions having one or more corresponding characteristics, and wherein obstructions during a current traverse of the work area by the work machine are detected by reference to the model based on current input data sets corresponding to the output signals from the one or more sensors.

18. A method of mapping obstructions in a work area traversed by a work machine, the method comprising:

iterative development of a model over time to correlate input data sets, corresponding to output signals from one or more sensors associated with the work machine, with labeled outcomes, wherein the labeled outcomes are selected from among obstructions having one or more corresponding characteristics;

during a current traverse of the work area by the work machine, and by reference to the model based on current input data sets corresponding to the output signals from the one or more sensors, detecting one or more obstructions at and/or below a ground surface; and modifying a mapped data structure associated with the work area, wherein a sensed location and one or more identified characteristics for each respective one of the one or more detected obstructions are mapped to corresponding locations in the mapped data structure, and wherein the mapped data structure comprises a multi-dimensional coordinate system;

wherein the sensed location is determined based on a location of the obstruction relative to the work machine and a current location of the work machine in the multidimensional coordinate system of the mapped data structure.

19. The method of claim 18, wherein the work machine comprises a machine frame and at least one ground-engaging work implement moveable with respect to the machine frame, the one or more sensors comprise a vibration sensor, at least one of the one or more obstructions is detected via output signals from the vibration sensor, and an identified location of the work machine upon detecting the at least one of the one or more obstructions corresponds to the sensed location for the at least one of the one or more obstructions;

the method further comprising:

modifying the mapped data structure to map sensed vibrations at respective locations within the work area to corresponding locations in the mapped data structure;

determining a baseline vibration level or range associated with the work area; and detecting the at least one of the one or more obstructions based at least in part on comparison of a respective vibration value to the baseline vibration level or range.

20. The method of claim 18, wherein the work machine comprises a machine frame and at least one ground-engaging work implement moveable with respect to the machine frame, the one or more sensors comprise a position sensor associated with a work implement actuator, and at least one of the one or more obstructions is detected via an error value for a detected position of the work implement actuator with respect to a commanded position of the work implement actuator.

\* \* \* \* \*